United States Patent [19]
Tanaka

[11] Patent Number: 5,576,415
[45] Date of Patent: Nov. 19, 1996

[54] METHOD FOR DRYING POLYAMIDE AND METHOD FOR SOLID-PHASE POLYMERIZATION OF POLYAMIDE

[75] Inventor: Kazumi Tanaka, Niigata, Japan

[73] Assignee: Mitsubishi Gas Chemical Company, Inc., Tokyo, Japan

[21] Appl. No.: 511,679

[22] Filed: Aug. 7, 1995

[30] Foreign Application Priority Data

Sep. 8, 1994 [JP] Japan ................................ 5-214622

[51] Int. Cl.$^6$ ................................................ C08G 69/28
[52] U.S. Cl. ...................... 528/310; 528/331; 528/335; 528/347; 528/480; 528/502 C
[58] Field of Search ..................... 528/335, 347, 528/480, 502 C, 331, 310

[56] References Cited

U.S. PATENT DOCUMENTS

| | | | |
|---|---|---|---|
| 3,840,500 | 10/1974 | Ryffel et al. | 528/313 |
| 4,987,215 | 1/1991 | Keil et al. | 528/312 |
| 5,006,629 | 4/1991 | Santa et al. | 528/349 |
| 5,051,491 | 9/1991 | Pipper et al. | 528/324 |

OTHER PUBLICATIONS

"A Method for Measurement of Crystallization Rate", J. H. Magill, Polymer 2, pp. 221–233, Jan. 1961.

*Primary Examiner*—Jeffrey C. Mullis
*Assistant Examiner*—P. Hampton-Hightower
*Attorney, Agent, or Firm*—Frishauf, Holtz, Goodman, Langer & Chick, P.C.

[57] ABSTRACT

There are disclosed a method for drying and a method for solid-phase polymerizing a crystallizable polyamide being in an amorphous state which comprises regulating the moisture concentration in the polyamide at its glass transition temperature to at least 0.15% by weight as determined by Karl Fisher titration; heating the polyamide thus regulated at a pressure of at least one arm without reducing the moisture to crystallize the same up to a crystallinity of at least 15% and; further heating the polyamide thus crystallized at a temperature lower than its melting point under reduced pressure with a batchwise heating apparatus. It is made possible according to the method for drying or the method for solid-phase polymerizing the crystallizable polyamide to effect its crystallization without causing tackified sticking or solidified sticking of the polyamide, along with drying or solid-phase polymerization with single apparatus and process, while dispensing with any pretreatment such as surface modification and preliminary treatment equipment intended for crystallization.

20 Claims, No Drawings

5,576,415

METHOD FOR DRYING POLYAMIDE AND METHOD FOR SOLID-PHASE POLYMERIZATION OF POLYAMIDE

BACKGROUND OF THE INVENTION
1. Field of the Invention

The present invention relates to a method for drying and solid-phase polymerizing crystallizable polyamide being in an amorphous state (that is, "noncrystalline", the same holds hereinafter). More particularly, it pertains to a method for drying and solid-phase polymerizing specific crystallizable polyamide being in an amorphous state by heating said crystallizable polyamide by the use of a batchwise heating apparatus, which method is capable of preventing the polyamide granules from intergranularly tackified sticking and/or solidified sticking, and at the same time, from tackified sticking and/or solidified sticking to the walls of the heating apparatus.

2. Description of the Related Arts

In general, polyamide to be used as a molding material is produced by polycondensation in a molten state, then taken out from the reaction vessel, solidified by quenching, thereafter cut into a suitable size, then molded into a granule such as pellet. Since the polyamide is treated in cooling water or in the air when made into the granule, the objective polyamide granules contain moisture (that is, "water", the same holds hereinafter) not less than the saturated moisture concentration on melting.

In addition, the procedure of taking out the polyamide from the reaction vessel and solidifying it by quenching is carried out by rapidly cooling the polyamide in a molten state, and thus the resultant polyamide is fixed usually in an amorphous state except for a polyamide having an extremely high crystallization rate.

The polyamide granules in an amorphous state, when subjected to melt molding as such, result in deterioration such as hydrolysis or foaming. Moreover, the variation in moisture content in the granules brings about a variation in the melt viscosity and thus exerts serious influence on the melt molding condition or processability of the polymer. For this reason, the moisture in the polyamide granules is usually removed by vacuum drying or through-flow drying at the glass transition temperature to a temperature lower than the melting point, prior to melt molding.

In order to obtain a polyamide having a high degree of polymerization, a polyamide is solid-phase polymerized, that is, heat treated at a temperature lower than the melting point in a solid phase under reduced pressure or in a stream of an inert gas.

Crystallizable polyamide granules in an amorphous state, when heated over the glass transition temperature, pass through a transition process from the amorphous state to a crystalline state. In the amorphous state, tackiness is manifested suddenly at around the glass transition temperature, and the tackification phenomenon continues until crystallization, thereby causing the disadvantage that, when the polyamide is dried or solid-phase polymerized, polyamide granule tackifiedly stick intergranularly or to the walls of a heating apparatus and also that lumps of the tackified sticking granules are solidified sticked if the lumps are crystallized without being disintegrated.

Under such circumstances, any of the following methods is generally put into practice in order to dry or solid-phase polymerize a polyamide being in an amorphous state.

A. A batchwise system in which a polyamide is heated in an inert gas or under reduced pressure to crystallize it and then further heated to carry out drying or solid-phase polymerization with a single batchwise heating apparatus such as a rotary drum.

B. A continuous system in which a polyamide is heated in a stream of an inert gas to crystallize it (preliminary crystallizing treatment) with a channel type agitating heating apparatus and thereafter is dried and solid-phase polymerized in a stream of an inert gas with a hopper type heating apparatus.

C. A semi-continuous system in which a polyamide is heated to crystallize it with a channel type agitating heating apparatus and thereafter is dried or solid-phase polymerized with a batchwise heating apparatus such as a rotary drum.

The channel type agitating heating apparatus is empolyed mainly for crystallizing a polyamide being in an amorphous state and, in order to dry and solid-phase polymerize, there is need for a treatment step with another apparatus.

As described above, the polyamide crystallization step is put into practice with a batchwise heating apparatus or a channel type agitating heating apparatus and involves the following problems.

(1) In the case where a batchwise heating apparatus such as a rotary drum is employed, at the time of tackified sticking and solidified sticking of polyamide granules, some problems take place in that sufficient agitational mixing for disintegrating the lumps of the polyamide granules can not be assured, whereby the rotation of the rotary drum is hindered and eccentricity, power fluctuation or the like is caused. As a countermeasure, operational conditions are set so as to suppress the tackified sticking by restraining heating-medium temperature as well as the temperature rise rate until the completion of crystallization or by suppressing the packing factor of the granules and enhancing the number of revolutions to positively mix the polymer granules. The drum is also equipped inside with a mechanism such as baffle plates for the purpose of disintegrating the tackified sticking and solidified sticking polyamide granules. However, the aforesaid countermeasure still suffers the disadvantages of prolonged operation hours, lowered productivity, and generation of powder due to the scraped granules.

(2) The channel type agitating heating apparatus is effective for mechanically disintegrating the lumps of polyamide granules which tackified stick and solidified stick to each other, but still controls heating-medium temperature so as to prevent polyamide granules from tackified sticking to the walls and agitation blades of the heating apparatus up to the completion of the crystallization. The channel type agitating heating apparatus is insufficient in sealing properties as compared with the rotary drum, and therefore, is not suitable for a polymer which is liable to yellowing due to thermal oxidation such as a polyamide even in a stream of an inert gas. Moreover, this apparatus requires a large amount of a highly pure inert gas and generates powder in an amount larger than that from the rotary drum, thus polluting normal granules.

Japanese Patent Application Laid-Open No. 197710/1992 discloses a method for crystallizing a polymer which proposes a method for crystallizing the chips of polymer which comprises feeding water or steam to cover the surface of chips by water and crystallize the chips by the use of a channel type agitating heating apparatus. However, as mentioned before there is a suspicion that the polyamide quality is deteriorated such as by yellowing because of the use of the channel type agitating heating apparatus.

Japanese Patent Application Laid-Open No. 149431/1981 proposes a method for subjecting poly(tetramethylene adipamide) to solid-phase polymerization in a steam-containing atmosphere for the purpose of preventing discoloring, but the method is not concerned with the prevention of tackified sticking and solidified sticking of the polymer granules which is an object of the present invention, and not one word is said regarding preventing such tackified sticking or solidified sticking.

SUMMARY OF THE INVENTION

It is an object of the present invention to provide a method for drying and solid-phase polymerizing crystallizable polyamide being in an amorphous state with minimized deterioration of the quality of crystallizable polyamide, which methods are capable of smoothly performing crystallization and drying of the polyamide or crystallization and solid-phase polymerization of the polyamide each with a single heating apparatus, while preventing the polyamide granules from intergranularly tackified sticking and solidified sticking at the same time, from tackified sticking and solidified sticking to the walls of a heating apparatus and while dispensing with a preliminary treatment step with other equipment intended for the crystallization of the polyamide granules.

As a result of intensive research and investigation made by the present inventor it has been found that the above-mentioned problems can be solved by crystallizing crystallizable polyamide having a specific moisture concentration with a batchwise heating apparatus and thereafter drying or solid-phase polymerizing the crystallized polyamide.

Specifically, the present invention relates to a method for drying a crystallizable polyamide being in an amorphous state which comprises regulating the moisture concentration in the polyamide at the glass transition temperature to at least 0.15% by weight as determined by a Karl Fisher titration thereof, said polyamide being formed from a xylylenediamine and an aliphatic dicarboxylic acid having 4 to 14 carbon atoms or an aromatic dicarboxylic acid; heating the polyamide thus regulated at a pressure of at least one atm without reducing the moisture to crystallize the same up to a crystallinity of at least 15% and; further heating the polyamide thus crystallized at a drying temperature lower than the melting point thereof under reduced pressure with a batchwise heating apparatus, and also to a method for solid-phase polymerizing a crystallizable polyamide being in an amorphous state which comprises regulating the moisture in the polyamide at the glass transition temperature to at least 0.15% by weight as determined by a Karl Fisher titration thereof, said polyamide being formed from a xylylenediamine and an aliphatic dicarboxylic acid having 4 to 14 carbon atoms or an aromatic dicarboxylic acid; heating the polyamide thus regulated at a pressure of at least one atm without reducing the moisture to crystallize the same up to a crystallinity of at least15% and; further heating the polyamide thus crystallized at a solid-phase polymerization temperature lower than the melting point thereof under reduced pressure with a batchwise heating apparatus.

DESCRIPTION OF PREFERRED EMBODIMENTS

The effect of the present invention is not sufficiently observed in a polyamide having an extremely high rate of crystallization even if it is almost free from moisture, a polyamide whose crystallization rate is less apt to be affected by the moisture therein, and a polyamide in which the glass transition temperature is close to the crystallization temperature even if it is almost free from moisture. The effect of the present invention is remarkably observed in a specific polyamide, that is, a crystallizable homopolyamide or copolyamide being in an amorphous state that is formed from xylylenediamine and an aliphatic dicarboxylic acid having 4 to 14 carbon atoms or an aromatic dicarboxylic acid. The polyamide to be used in the present invention is the above-mentioned polyamide.

The xylylenediamine is exemplified by m-xylylenediamine, p-xylylenediamine and o-xylylenediamine and may contain one or two or more of them.

The aliphatic dicarboxylic acid having 4 to 14 carbon atoms is exemplified by succinic acid, adipic acid, sebacic acid and dodecanedioic acid. The aromatic dicarboxylic acid is exemplified by isophthalic acid, terephthalic acid and 2,6-naphthalenedicarboxylic acid. The dicarboxylic acid may contain one or two or more of the above-exemplified ones. Of these, adipic acid is preferably usable in view of the physical properties and the like of a product molded from the polyamide. Also preferable is a crystallizable homopolyamide or copolyamide that is formed from a xylylenediamine composed of at least 60 mol % of m-xylylenediamine and at most 40 mol % of p-xylylenediamine and at least one dicarboxylic acid selected from the group consisting of adipic acid, terephthalic acid and isophthalic acid in view of the physical properties and the like of a product molded from the polyamide. The polyamide to be used in the present invention is, as described hereinbefore, a polyamide which is formed from a xylylenediamine and an aliphatic dicarboxylic acid having 4 to 14 carbon atoms or an aromatic dicarboxylic acid, but may be a copolyamide containing at most 20 mol % of polyamide chain unit (units) other than the above-mentioned polyamide based on the same.

The other compound which forms the polyamide chain unit (units) is not specifically limited, but is exemplified by a lactam such as caprolactam, valerolactam, laurolactam and undecalactam; an aminocarboxylic acid such as 11-aminoundecanoic acid and 12-aminodecanoic acid; and a diamine such as tetramethylenediamine, hexamethylenediamine and 1,3-bisaminomethylcyclohexane.

The crystallizable polyamide to be used in the present invention is a polyamide in which a heat absorption peak assigned to melting is identified in DSC (differential scanning calorimetry) and which has a crystallinity of at least 15%, preferably at least 20% after being dried or solid-phase polymerized. By the term "crystallizable polyamide being in an amorphous state" as used herein is meant a polyamide which is maintained in a transparent state by quenching and the like after being melted.

The heating apparatus to be used for the drying and solid-phase polymerization of the polyamide according to the present invention being a batchwise heating apparatus, is preferably exemplified by but not limited to a rotary-drum type heating apparatus such as a Tumble drier, a Conical drier and a Rotary drier as well as a Nauta mixer which is a conical heating apparatus equipped inside with rotational blades.

The operational conditions of the batchwise heating apparatus, namely the moving velocity of polyamide granules in the apparatus is selected within the scope that the polyamide granules are uniformly subjected to heat transfer, and thus there is no need to impart the granules with a high moving velocity intended for the prevention of tackified sticking. Since the moving velocity of the polyamide granules depends upon the packing factor and agitational velocity, the agitational velocity needs to be high for a high packing factor so that the granules are uniformly heated, whereas it can be lowered for a low packing factor. Specifically in the case of a rotary drum, the number of revolutions of the drum is preferably 0.5 to 30 rpm for a packing factor of less than 40%, and 2 to 60 rpm for a packing factor of not less than 40%. The above-mentioned velocity or the number of revolutions is not specifically limited to the foregoing provided that the operational conditions satisfy the uniform heat transfer through the polyamide granules.

The moisture concentration in the polyamide at the glass transition temperature thereof is preferably at least 0.15% by weight based on the polyamide for the purpose of preventing solidified sticking, and at least 0.25% by weight based on the same for the purpose of preventing not only solidified sticking but also tackified sticking. Moreover, taking into consideration the drying step after the crystallization and the removing procedure of the condensation water in the solid-phase polymerization step, the moisture concentration is preferably 0.25 to 5% by weight.

As a method for regulating the moisture concentration, mention may be made of a method in which polyamide granules are allowed in advance to absorb moisture or water by taking advantage of the moisture absorbing property of the polyamide so that the moisture concentration in the polyamide at the glass transition temperature thereof is regulated to a prescribed value, and subsequently the polyamide thus regulated is fed in a batchwise heating apparatus; a method in which polyamide granules along with ice, water or steam are fed in a batchwise heating apparatus, followed by the temperature raising to allow the polyamide to absorb moisture during the temperature raising so as to regulate the moisture concentration therein at the glass transition temperature thereof; and a method in Which polyamide granules are fed in a batchwise heating apparatus followed by temperature raising, water or steam is fed in the apparatus during the temperature rise of the granules from room temperature to the glass transition temperature to allow the polyamide to absorb moisture so as to regulate the moisture concentration therein at the glass transition temperature thereof. In each of the above-mentioned methods, excess moisture which is not absorbed in the polyamide may be present in the batchwise heating apparatus.

The present invention, however, is not limited to the above-exemplified methods for regulating the moisture concentration. In the case where the polyamide has a glass transition temperature of 100° C. or higher, the batchwise heating apparatus is preferably to be maintained under a hermetically sealed condition, so as not to dissipate moisture enough for regulating the moisture concentration to the outside of the apparatus. That is, the apparatus is preferably kept inside under pressure. When the polyamide has a glass transition temperature lower than 100° C., the batchwise heating apparatus may be kept inside under atmospheric pressure, but is preferably of a structure which prevents moisture for regulating the moisture concentration from easily being dissipated to outside the apparatus.

The atmosphere in the apparatus at a temperature lower than the crystallizing temperature may be that of an inert gas or air, but is preferably that of an inert gas as the polyamide is liable to yellowing.

The drying temperature for the polyamide is preferably in the temperature range wherein the polycondensation of the polyamide hardly proceeds, and is selected in the temperature range of the glass transition temperature to a temperature lower than the melting point, particularly preferably from the crystallization temperature to 180° C. It is not necessary to suppress a heating-medium temperature until the polyamide is crystallized in the temperature raising step reaching the drying temperature. Thus it is possible to set a heating-medium temperature for the purpose of drying after the completion of the feeding of the polyamide being in an amorphous state.

It is necessary to set the temperature, the degree of pressure reduction and the heating time during drying so as to enable the removal of the moisture regulated for the purpose of preventing tackified sticking and solidified sticking and the moisture in excess of the saturated moisture concentration at the time of melting which is the cause of foaming at the time of melt molding. Specifically, preferable heating conditions include a degree of pressure reduction of at least 100 Torr (at most 660 Torr vacuum) in the aforesaid temperature range and at least 30 minutes of heating time.

The solid-phase polymerization temperature for the polyamide is preferably in the temperature range wherein the polycondensation of the polyamide proceeds easily, and is selected in the temperature range of the crystallization temperature to a temperature lower than the melting point, particularly preferably from 150° C. to a temperature lower than the melting point. It is not necessary to suppress a heating-medium temperature until the polyamide is crystallized in the temperature raising step reaching the solid-phase polymerization temperature. Thus it is possible to set a heating-medium temperature for the purpose of solid-phase polymerization after the completion of the feeding of the polyamide being in an amorphous state.

The temperature, the degree of pressure reduction and the heating time during solid-phase polymerization are determined as the conditions for reaching a prescribed degree of polymerization. In view of the melt moldability of the polyamide granules, it is also necessary to set the aforesaid three factors so as to enable the removal of the moisture regulated for the purpose of preventing tackified sticking and solidified sticking, the moisture in excess of the saturated moisture concentration at the time of melting which is the cause of foaming at the time of melt molding, and the condensation water formed by the polycondensation. Specifically, preferable heating conditions include a degree of pressure reduction of at least 500 Torr (at most 260 Torr vacuum) in the above-mentioned temperature range and at least 30 minutes of heating time.

The following can be taken into consideration as the function which enables tackified sticking and solidified sticking to be prevented from occuring by a method in which a crystallizable polyamide being in an amorphous state is regulated so as to have a specific moisture concentration and then is crystallized with a batchwise heating apparatus.

When a crystallizable polyamide being in an amorphous state is brought to its glass transition temperature or higher, microbrownian motion takes place in the molecular chain, enabling to transfer to a crystalline state. The manifestation of tackiness as observed from around the glass transition temperature to the crystallization temperature is the cause for tackified sticking, but the tackified phenomenon is avoided if the polymer granules are crystallized on the surfaces thereof. It is well known that the glass transition temperature is lowered when water is present in the amorphous portion of a polymer having a hydrogen bond, since the water molecular cuts off the hydrogen bond and behaves as a plasticizer. Likewise, when water is incorporated into the amorphous portion of a polyamide, its glass transition temperature is lowered, whereby the crystallization starting temperature is lowered and the crystallization rate is enhanced by the presence of water.

That is to say, the glass transition temperature and crystallization starting temperature that are inherent in a polyamide are lowered and the crystallization rate is enhanced by regulating the moisture concentration in a crystallizable polyamide being in an amorphous state to a specific value and subsequently heating the polyamide. It is thought that as a result, the temperature range or period of time which mainfests tackiness is restricted and further, the aforesaid temperature range is lowered, thus suppressing tackification and consequently preventing tackified sticking and solidified sticking.

It is presumed that heating with a batchwise heating apparatus prevents moisture from being dissipated outside the apparatus and the moisture is efficiently incorporated in the polyamide, thereby remarkably exhibiting the working effect on the prevention of tackified sticking and solidified sticking.

The methods according to the present invention exerts the undermentioned effects (1) to (7) with respect to the drying and solid-phase polymerization of the polyamide.

(1) The polyamide being in an amorphous state can be crystallized without causing tackified sticking or solidified sticking of polyamide granules intergranularly or to the walls of the heating apparatus, while dispensing with any pretreatment such as surface modification.

(2) It is made possible to smoothly crystallize the polyamide granules being in an amorphous state by the use of the batchwise heating apparatus, and accordingly, preliminary treatment equipment intended for crystallization is not required at all, thereby enabling crystallization with drying and crystallization with a solid-phase polymerization with a single apparatus and a single step.

(3) There is no need to suppress the heating-medium temperature until the crystallization of polyamide granules is completed and it is possible, from the start of temperature raising to set the heating-medium temperature for the purpose of drying and solid-phase polymerization, whereby the process can be simplified.

(4) Heat transfer efficiency is improved by the effect of moisture (steam) in the temperature raising step up to the start of pressure reduction, whereby the temperature raising time can be shortened.

(5) It is made possible to enhance the packing factor of the polyamide granules in the batchwise heating apparatus, whereby the productivity of the objective polyamide is improved.

(6) There is no need to enhance the moving velocity of the polyamide granules in the batchwise heating apparatus, whereby power consumption can be reduced.

(7) Heating of polyamide granules with the batchwise heating apparatus can suppress quality deterioration such as polyamide yellowing and powder generation and decrease inert gas consumption comparaed with the use of a channel type agitating heating apparatus.

In the following, the present invention will be described in more detail with reference to non-limitative examples and comparative examples. Measurements for evaluating the results of examples and comparative examples were made according to the following methods.

(1) Glass Transition Temperature (°C.)

This was measured in a stream of nitrogen at a temperature raising rate of 10° C./minute by the use of DSC (model 3100) produced by MAC Science Co., Ltd.

(2) Number-average Molecular Weight (Mn)

This was obtained by calculating with the following formula from the determined values of the amino group and the carboxyl group.

$$Mn = \frac{2}{[NH_2] + [COOH]}$$

where
[$NH_2$]: concentration of amino group (equivalent/g)
[COOH]: concentration of carboxyl group (equivalent/g)

(3) Moisture Concentration at Glass Transition Temperature (% by Weight)

After the pellet temperature reached the glass transition temperature during the temperature raising step, 2 g of the pellet was collected and subjected to moisture-content determination under a vaporizing condition of 30 minutes at the glass transition temperature to obtain the regulated moisture concentration in the pellet by means of a Karl Fisher titrator (model CA-05) and a vaporizer (model VA-05) both produced by Mitsubishi Chemical Corporation Ltd.

(4) Moisture Content (% by Weight)

2 g of the pellet was subjected to water-content determination under a vaporizing condition of 30 minutes at the melting point to obtain the moisture content in the pellet by means of a Karl Fisher titrator (model CA-05) and a vaporizer (model VA-05) both produced by Mitsubishi Chemical Corporation Ltd.

(5) Degree of Yellowness (b Value)

The degree of yellowness (b value) of the pellet was measured by means of a color measuring system (model Σ80) produced by Nippon Denshoku Ind. Co., Ltd.

(6) Powder Content (ppm)

400 g of the pellet placed on a sieve of 1 mm opening was washed with 5000 milliliter of water, and the water was filtered with a glass filter. The resultant filter cake was dried at 60° C. for 24 hours under vacuum followed by weighing of the dried powder.

EXAMPLE 1 AND COMPARATIVE EXAMPLE 1

By the use of an extruder of 20 mm in diameter equipped with a vent, poly(metaxylene adipamide)(hereinafter referred to as "Nylon MXD 6") in the form of pellet was extruded at 270° C., while the extruder was evacuated to form a vacuum through the vent port, The molten polymer which was extruded through the die was directed onto a net belt and solidified by cooling with dehumidified air at 5° C. having a dew point of −30° C. The solidified polymer was cut off with a pelletizer to produce a pellet in an amorphous state having a glass transition temperature of 78° C.

The resultant Nylon MXD 6 pellet in an amount of 400 g was placed in a 1000 milliliter (mL) eggplant type flask, which was then immersed in an oil bath and was rotated at 40 rpm by utilizing the driving section of an evaporator. The procedure of evacuating the flask to attain a vacuum of 1 Torr or less and then restoring to atmospheric pressure with nitrogen was performed three times repeatedly, and distilled water was fed in the flask through a nitrogen exhaust port in a stream of nitrogen. The amount of distilled water added in the flask was varied as given in Table 1. Subsequently the temperature in the oil bath was raised from room temperature to a temperature of 15° C. lower than the melting point of the polymer at a temperature rise rate of 80° C./hour to heat the pellet and proceed with solid-phase polymerization.

After the pellet temperature reached the glass transition temperature, 2 g of the pellet was collected to measure the moisture concentration in the pellet with the results being given in Table 1. Upon the completion of pellet crystallization, evacuation of the flask was started. After the pellet temperature reached 200° C., the flask pressure was restored to atmospheric pressure with nitrogen and the oil-bath heating was discontinued. Thereafter, a coiled tube was immersed in the oil bath, and city water was allowed to flow through the tube to cool the oil bath. When the pellet was cooled as low as 80° C., the flask was drawn up from the oil bath, the quality of the pellet solid-phase polymerized was evaluated, and also the amount of the pellet solidified stuck to the flask wall was weighed. Table 1 gives the state of the pellet solidified stuck to the wall, the amount of the pellet solidified stuck to the wall after the solid-phase polymerizaion and quality analysis results for the pellet solid-phase polymerized.

It can been seen from Table 1 that the tackified sticking and solidified sticking of the pellet onto the inside wall of the flask are prevented by properly regulating the moisture concentration in the polyamide, the temperature raising time in Example 1 is shortened in comparison with that in comparative Example 1 in which distilled water was not added and that the quality of the pellet solid-phase polymerized in Example 1 is comparable to that in Comparative Example 1.

TABLE 1

|  | Example 1 | Comp. Example 1 |
| --- | --- | --- |
| Amount of added distilled water (g) | 1.8 | 0 |
| Properties of Nylon MXD 6 in amorphous state |  |  |
| Number-average molecular weight | 16900 | 16900 |
| b value | −1.5 | −1.5 |
| Powder content (ppm) | 130 | 130 |
| Moisture concentration at glass transition temperature (% by weight) | 0.30 | 0.01 |
| State of pellet tackified stuck to wall | None | Total amount of pellet |
| Temperature region of tackified sticking (°C.) | — | 84–100 |
| Time required for reaching 200° C. internal temperature (hr) | 5.1 | 5.9 |
| Amount of pellet solidified stuck to wall (% by weight) | 0 | 70 |
| Quality of pellet solid-phase polymerized |  |  |
| Number-average molecular weight | 26000 | 26200 |
| Moisture content (% by weight) | 0.03 | 0.03 |
| b value | −2.5 | −2.4 |
| Powder content (ppm) | 130 | 130 |

Remarks Comp. Example: Comparative Example

COMPARATIVE EXAMPLE 2

Nylon MXD 6 pellet in an amorphous state same as that in Example 1 was treated by heating for 7 minutes in a stream of nitrogen so as to attain a pellet temperature of 140° C. by the use of a channel type agitating heating apparatus to crystallize the pellet, the properties of which are given in Table 2. The resultant crystallized Nylon MXD 6 pellet in an amount of 400 g was placed in a 1000 mL eggplant type flask, which was then immersed in an oil bath and was rotated at 40 rpm by utilizing the driving section of an evaporator. The procedure of evacuating the flask to attain a vacuum of 1 Torr or less and then restoring to atmospheric pressure with nitrogen was performed three times repeatedly. Subsequently the temperature in the oil bath was raised from room temperature to a temperature of 15° C. lower than the melting point of the polymer at a temperature rise rate of 80° C./hour to heat the pellet and proceed with solid-phase polymerization.

When the temperature reached the temperature when the crystallization was completed in Comparative Example 1, evacuation of the flask was started. After the pellet temperature reached 200° C., the flask pressure was restored to atmospheric pressure with nitrogen and the oil-bath heating was discontinued. Thereafter, a coiled tube was immersed in the oil bath, and city water was allowed to flow througn the tube to cool the oil bath. When the pellet was cooled as low as 80° C., the flask was drawn up from the oil bath, the quality of the pellet solid-phase polymerized was evaluated, and also the amount of the pellet solidified stuck to the flask wall was weighed. Table 2 gives the state of the pellet tackified stuck to the wall, the amount of the pellet solidified stuck to the wall after the solid-phase polymerization and quality analysis results for the pellet solid-phase polymerized.

EXAMPLE 2

Nylon MXD pellet in an amorphous state same as that in Example 1 was immersed in distilled water at room temperature for 24 hours, and thereafter was allowed to naturally dry at room temperature for 24 hours. The properties of the resultant pellet are given in Table 2.

The resultant Nylon MXD 6 pellet in an amount of 400 g was placed in a 1000 mL eggplant type flask, which was then immersed in an oil bath and was rotated at 40 rpm by utilizing the driving section of an evaporator. The procedure of evacuating the flask to attain a vacuum of 1 Torr or less and then restoring to atmospheric pressure with nitrogen was performed three times repeatedly. Subsequently the temperature in the oil bath was raised from room temperature to a temperature of 15° C. lower than the melting point of the polymer at a temperature rise rate of 80° C./hour to heat the pellet and proceed with solid-phase polymerization.

After the pellet temperature reached the glass transition temperature, 2 g of the pellet was collected to measure the moisture conentration in the pellet with the results being 0.38% by weight. Upon the completion of pellet crystallization, evacuation of the flask was started. After the pellet temperature reached 200° C., the flask pressure was restored to atmospheric pressure with nitrogen and the oil-bath heating was discontinued. Thereafter, a coiled tube was immersed in the oil bath, and city water was allowed to flow through the tube to cool the oil bath. When the pellet was cooled as low as 80° C., the flask was drawn up from the oil bath, the quality of the pellet solid-phase polymerized was evaluated, and also the amount of the pellet solidified stuck to the flask wall was weighed. Table 2 gives the state of the pellet tackified stuck to the wall, the amount of the pellet solidified stuck to the wall after the solid-phase polymerization and quality analysis results for the pellet solid-phase polymerized.

It can be seen from the comparison between Table 1 and Table 2 that the pellet crystallized with a channel type agitating heating apparatus suffers an increase in the degree of yellowness and in the powder amount during the crystallization treatment as well as a remarkable increase in the degree of yellowness during the solid-phase polymerization. It is also understood that, similarly to the case where distilled water is added, the regulation of the moisture concentration by allowing the pellet in advance to absorb moisture can exhibit the effect on the prevention of tackified sticking and solidified sticking.

TABLE 2

|  | Comp. Example 2 | Example 2 |
|---|---|---|
| Properties of Nylon MXD 6 in amorphous state | | |
| Number-average molecular weight | 16900 | 16900 |
| b value | −1.5 | −1.5 |
| Powder content (ppm) | 130 | 130 |
| Properties of Nylon MXD 6 crystallized with channel type agitating heating apparatus | | |
| Number-average molecular weight | 17000 | — |
| b value | 0.2 | — |
| Powder content (ppm) | 310 | — |
| Properties of Nylon MXD 6 after immersed in water | | |
| Number-average molecular weight | — | 16900 |
| b value | — | −1.5 |
| Moisture concentration at glass transition temperature (% by weight) | — | 0.38 |
| State of pellet tackified stuck to wall | None | None |
| Amount of pellet solidified stuck to wall (% by weight) | 0 | 0 |
| Quality of pellet solid-phase polymerized | | |
| Number-average molecular weight | 26500 | 26000 |
| Moisture content (% by weight) | 0.04 | 0.03 |
| b value | 4.6 | −3.0 |
| Powder content (ppm) | 320 | — |

Remarks Comp. Example: Comparative Example

EXAMPLE 3 AND COMPARATIVE EXAMPLE 3

A copolyamide (Nylon MP 6 T) pellet in an amount of 400 g which is in an amorphous state and has a glass transition temperature of 90° C. and a composition in molar ratio of m-xylylenediamine/p-xylylehediamine//adipic acid/terephthalic acid=60/40//70/30 was placed in 1000 mL eggplant type flask, which was then immersed in an oil bath and was rotated at 40 rpm by utilizing the driving section of an evaporator. The procedure of evacuating the flask to attain a vacuum of 1 Torr or less and then restoring to atmospheric pressure with nitrogen was performed three times repeatedly, and distilled water was fed in the flask through a nitrogen exhaust port in a stream of nitrogen. The amount of distilled water added in the flask was varied as given in Table 3. Subsequently the temperature in the oil bath was raised from room temperature to a temperature of 15° C. lower than the melting point of the polymer at a temperature rise rate of 80° C./hour to heat the pellet and proceed with solid-phase polymerization.

After the pellet temperature reached the glass transition temperature, 2 g of the pellet was collected to measure the moisture concentration in the pellet with the results being given in Table 3. Upon the completion of pellet crystallization, evacuation of the flask was started. After the pellet temperature reached 200° C., the flask pressure was restored to atmospheric pressure with nitrogen and the oil-bath heating was discontinued. Thereafter, a coiled tube was immersed in the oil bath, and city water was allowed to flow through the tube to cool the oil bath. When the pellet was cooled as low as 80° C., the flask was drawn up from the oil bath, the quality of the pellet solid-phase polymerized was evaluated, and also the amount of the pellet solidified stuck to the flask wall was weighed. Table 3 gives the state of the pellet tackified stuck to the wall, the amount of the pellet solidified stuck to the wall after the solid-phase polymerization and quality analysis results for the pellet solid-phase polymerized.

It can been seen from Table 3 that the tackified sticking and solidified sticking of the pellet onto the inside wall of the flask are prevented by properly heating in the presence of moisture even if a copolyamide is used.

TABLE 3

|  | Example 3 | Comp. Example 3 |
|---|---|---|
| Amount of added distilled water (g) | 12 | 0 |
| Moisture concentration at glass transition temperature (% by weight) | 2.0 | 0.1 |
| State of pellet tackified stuck to wall | None | Total amount of pellet |
| Temperature region of tackified sticking (°C.) | — | 107~131 |
| Amount of pellet solidified stuck to wall (% by weight) | 0 | 90 |

Remarks Comp. Example: Comparative Example

What is claimed is:

1. A method for drying a crystallizable polyamide being in an amorphous state which comprises:

(a) regulating the moisture in polyamide at the glass transition temperature to a concentration of at least 0.15% by weight as determined by a Karl Fisher titration thereof, said polyamide being formed from a xylylenediamine and an aliphatic dicarboxylic acid having 4 to 14 carbon atoms or an aromatic dicarboxylic acid;

(b) heating the polyamide from step (a) at a pressure of at least one atm without reducing the moisture concentration to crystallize the polyamide up to a crystallinity of at least 15% and;

(c) further heating the crystallized polyamide from step (b) at a drying temperature lower than the melting point of the polyamide under reduced pressure with a batchwise heating apparatus.

2. A method for solid-phase polymerizing crystallizable polyamide being in an amorphous state which comprises: p1 (a) regulating moisture in the polyamide at the glass transition temperature to a concentration of at least 0.15% by weight as determined by a Karl Fisher titration thereof, said polyamide being formed from a xylylenediamine and an aliphatic dicarboxylic acid having 4 to 14 carbon atoms or an aromatic dicarboxylic acid;

(b) heating the polyamide from step (a) at a pressure of at least one atm without reducing the moisture concentration to crystallize the polyamide up to a crystallinity of at least 15% and;

(c) further heating the crystallized polyamide from step (b) at a solid-phase polymerization temperature lower than the melting point of the polyamide under reduced pressure with a batchwise heating apparatus.

3. The method for drying a polyamide according to claim 1 wherein the crystallizable polyamide is a crystallizable homopolyamide or copolyamide which is formed from a xylylenediamine comprising at least 60 mol % of m-xylylenediamine and at most 40 mol % of p-xylylenediamine and at least one dicarboxylic acid selected from the group consisting of adipic scid, terephthalic acid and isophthalic acid.

4. The method for solid,phase polymerizing a polyamide according to claim 2 wherein the crystallizable polyamide is a crystallizable homopolyamide or copolyamide which is formed from a xylylenediamine comprising at least 60 mol % of m-xylylenediamine and at most 40 mol % of p-xylenediamine and at least one dicarboxylic acid selected from the group consisting of adipic acid, terephthalic acid and isophthalic acid.

5. The method for drying a polyamide according to claim 1 wherein the aliphatic dicarboxylic acid is adipic acid.

6. The method for solid-phase polymerizing a polyamide according to claim 2 wherein the aliphatic dicarboxylic acid is adipic acid.

7. The method for drying a polyamide according to claim 1 wherein the moisture concentration in the polyamide is regulated by allowing the polyamide to absorb moisture or water.

8. The method for solid-phase polymerizing a polyamide according to claim 2 wherein the moisture concentration in the polyamide is regulated by allowing the polyamide to absorb moisture or water.

9. The method for drying a polyamide according to claim 1 wherein the moisture concentration in the polyamide is regulated with liquid water or steam.

10. The method for solid-phase polymerizing a polyamide acording to claim 2 wherein the moisture concentration in the polyamide is regulated with liquid water or steam.

11. The method for drying a polyamide according to claim 1 wherein the batchwise heating apparatus is a rotary drum.

12. The method for solid-phase polymerizing a polyamide according to claim 2 wherein the batchwise heating apparatus is a rotary drum.

13. The method for drying a polyamide according to claim 1 wherein the crystallized polyamide is heated at a drying temperature of the crystallization temperture of the polyamide to 180° C. under reduced pressure.

14. The method for solid-phase polymerizing a polyamide according to claim 2 wherein the crystallized polyamide is heated at a solid-phase polymerization temperature of 150° C. to a temperature lower than the melting point of the polyamide under reduced pressure.

15. The method for drying a polyamide according to claim 13 wherein the polyamide is heated in step (b) to attain crystallinity of at least 20%.

16. The method for solid-phase polymerizing a polyamide according to claim 14 wherein the polyamide is heated in step (b) to attain a crystallinity of at least 20%.

17. The method for drying a polyamide according to claim 15 wherein the moisture concentration of the polyamide in step (a) is regulated to 0.25 to 5% by weight.

18. The method for solid-phase polymerizing a polyamide according to claim 16 wherein the moisture concentration of the polyamide in step (a) is regulated to 0.25 to 5% by weight.

19. The method for drying a polyamide according to claim 17 wherein the heating of the crystalline polyamide is carried out at a degree of pressure reduction of at least 100 Torr for a heating time of at least 30 minutes.

20. The method for solid-phase polymerizing a polyamide according to claim 18 wherein the heating of the crystalline polyamide is carried out at a degree of pressure reduction of at least 500 Torr for a heating time of at least 30 minutes.

* * * * *